United States Patent
Higashiyama et al.

(10) Patent No.: US 9,741,488 B2
(45) Date of Patent: Aug. 22, 2017

(54) POWER TRANSMISSION COIL

(71) Applicant: Panasonic Intellectual Property Management Co., Ltd., Osaka (JP)

(72) Inventors: Koji Higashiyama, Osaka (JP); Steffen Werner, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 310 days.

(21) Appl. No.: 14/413,582

(22) PCT Filed: Jul. 10, 2013

(86) PCT No.: PCT/JP2013/004261
§ 371 (c)(1),
(2) Date: Jan. 8, 2015

(87) PCT Pub. No.: WO2014/013699
PCT Pub. Date: Jan. 23, 2014

(65) Prior Publication Data
US 2015/0294784 A1  Oct. 15, 2015

(30) Foreign Application Priority Data
Jul. 19, 2012  (JP) .................................. 2012-160201

(51) Int. Cl.
*H01F 38/14* (2006.01)
*H02J 7/02* (2016.01)
(Continued)

(52) U.S. Cl.
CPC ............. *H01F 38/14* (2013.01); *H01F 27/02* (2013.01); *H01F 27/2804* (2013.01);
(Continued)

(58) Field of Classification Search
CPC ............ H01F 38/14; H01F 27/02; H02J 17/00
(Continued)

(56) References Cited

U.S. PATENT DOCUMENTS

| 2009/0015197 A1* | 1/2009 | Sogabe ................. H02J 7/0011 320/108 |
| 2011/0018499 A1 | 1/2011 | Fujiwara |

(Continued)

FOREIGN PATENT DOCUMENTS

| JP | 06-311659 A | 11/1994 |
| JP | 2009-254098 A | 10/2009 |

(Continued)

OTHER PUBLICATIONS

International Search Report issued in PCT/JP2013/004261, dated Aug. 20, 2013, with English translation.

*Primary Examiner* — Rexford Barnie
*Assistant Examiner* — Terrence Willoughby
(74) *Attorney, Agent, or Firm* — McDermott Will & Emery LLP

(57) ABSTRACT

A power transmission coil includes a plane coil including a no-wire portion and a coil wound about a no-wire portion, a cover for covering the plane coil from above, a first foreign-matter-detecting unit provided at the no-wire portion, and a power control circuit electrically connected to the plane coil and the first foreign-matter-detecting unit. An upper surface of the cover has a first inclining portion inclining toward the first foreign-matter-detecting unit. The power control circuit transmits power through the plane coil if a foreign matter is not detected in the no-wire portion based on an output from the first foreign-matter-detecting unit. The power control circuit is configured to stop transmitting power through the plane coil if foreign matter is detected in the no-wire portion based on an output from the first foreign-matter-detecting unit. This power transmission (Continued)

coil is capable of detecting a small foreign matter that may generate heat.

8 Claims, 11 Drawing Sheets

(51) Int. Cl.
    *H01F 27/28*     (2006.01)
    *H01F 27/40*     (2006.01)
    *H02J 5/00*     (2016.01)
    *H02J 17/00*     (2006.01)
    *H01F 27/02*     (2006.01)

(52) U.S. Cl.
    CPC ....... *H01F 27/2823* (2013.01); *H01F 27/402* (2013.01); *H02J 5/005* (2013.01); *H02J 7/025* (2013.01); *H02J 17/00* (2013.01)

(58) Field of Classification Search
    USPC ......................................................... 307/104
    See application file for complete search history.

(56) References Cited

U.S. PATENT DOCUMENTS

| | | |
|---|---|---|
| 2013/0063085 A1 | 3/2013 | Takada et al. |
| 2013/0181667 A1 | 7/2013 | Takeshita et al. |

FOREIGN PATENT DOCUMENTS

| | | |
|---|---|---|
| JP | 2011-244531 A | 12/2011 |
| WO | 2012-039077 A1 | 3/2012 |

\* cited by examiner

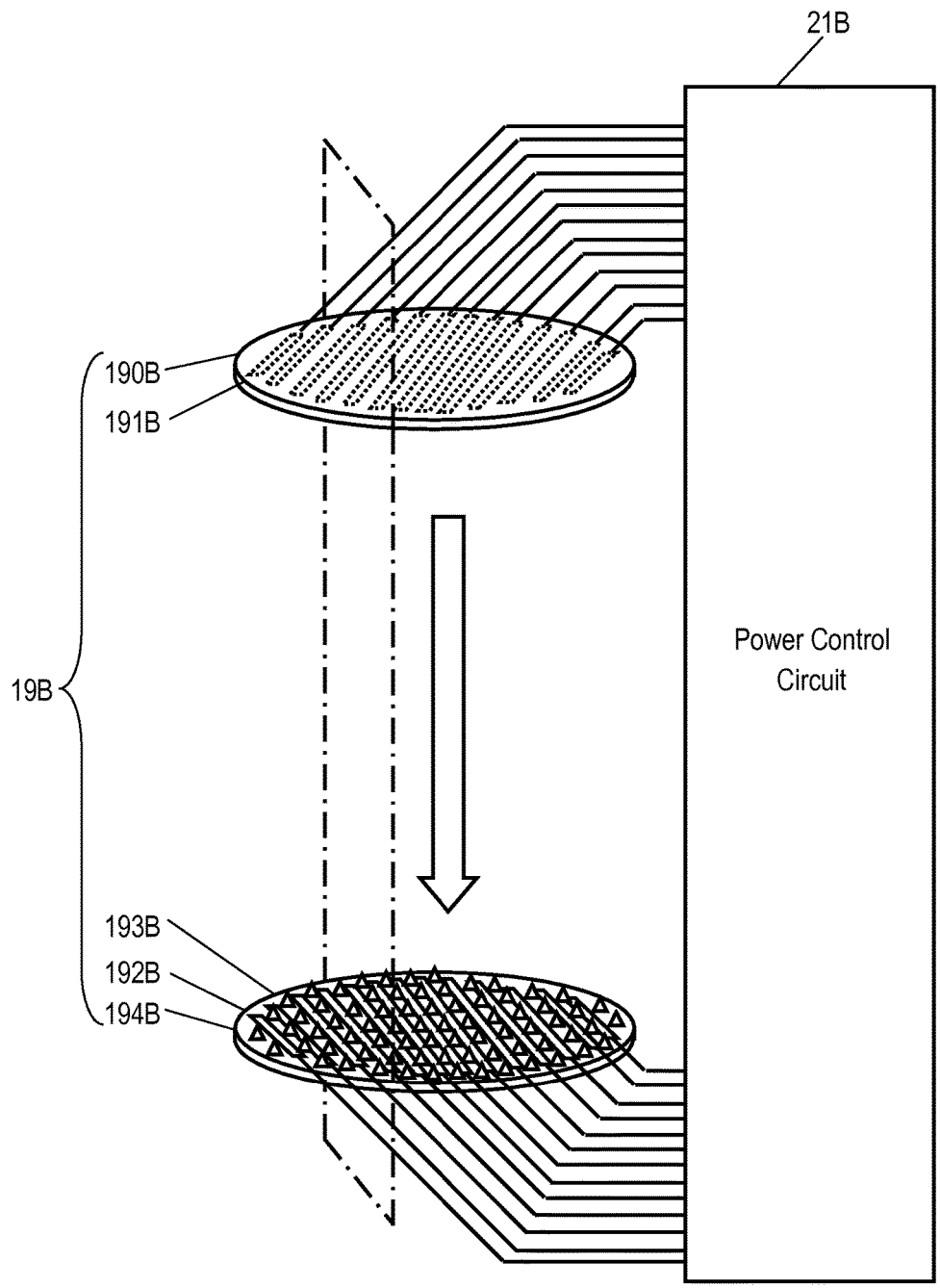

POWER TRANSMISSION COIL

RELATED APPLICATIONS

This application is the U.S. National Phase under 35 U.S.C. §371 of International Application No. PCT/JP2013/004261, filed on Jul. 10, 2013, which in turn claims the benefit of Japanese Application No. 2012-160201, filed on Jul. 19, 2012, the disclosures of which Applications are incorporated by reference herein.

TECHNICAL FIELD

The present invention relates to a power transmission coil for transmitting electric power without contacting.

BACKGROUND ART

In recent years, non-contact power supply technology transmitting power without contacting and direct electrical connection has been developed.

FIG. 11 is a block diagram of conventional resonance-type non-contact power supply system 500 disclosed in PTL 1. Power supply system 500 charges a secondary battery using non-contact power supply technology. The system includes power-supply equipment 101 and mobile-object-side equipment 123. Power-supply-side equipment 101 includes primary resonant coil 113 that has power supplied from high-frequency power supply 110. Mobile-object-side equipment 123 includes secondary resonant coil 121 that receives power from primary resonant coil 113, voltage sensor 127 that detects the voltage of battery 125, and vehicle-side controller 129 that senses the state of charge according the detection signal.

Vehicle-side controller 129 estimates the impedance value of battery 125 and determines that a foreign matter exists between primary resonant coil 113 and secondary resonant coil 121 if the absolute value of the difference between the estimated impedance value and the present impedance value of battery 125 is larger than a threshold. This system can detect the foreign matter that adversely affects power transmission without a dedicated sensor.

CITATION LIST

Patent Literature

PTL 1: Japanese Patent Laid-Open Publication No. 2011-244531

SUMMARY

A power transmission coil includes a plane coil including a coil wound about a no-wire portion, a cover for covering the plane coil from above, a first foreign-matter-detecting unit provided at the no-wire portion, and a power control circuit electrically connected to the plane coil and the first foreign-matter-detecting unit. An upper surface of the cover has an inclining portion inclining toward the first foreign-matter-detecting unit. The power control circuit is configured to cause the plane coil to transmit power if a foreign matter is not detected at the no-wire portion based on an output from the first foreign-matter-detecting unit. The power control circuit is configured to cause the plane coil to stop transmitting power if foreign matter is detected at the no-wire portion based on an output from the first foreign-matter-detecting unit.

This power transmission coil can detect a small foreign matter that may produce heat.

BRIEF DESCRIPTION OF DRAWINGS

FIG. 7B is an exploded perspective view of the power transmission coil according to Embodiment 2.

DETAIL DESCRIPTION OF PREFERRED EMBODIMENTS

Exemplary Embodiment 1

Figure 1:
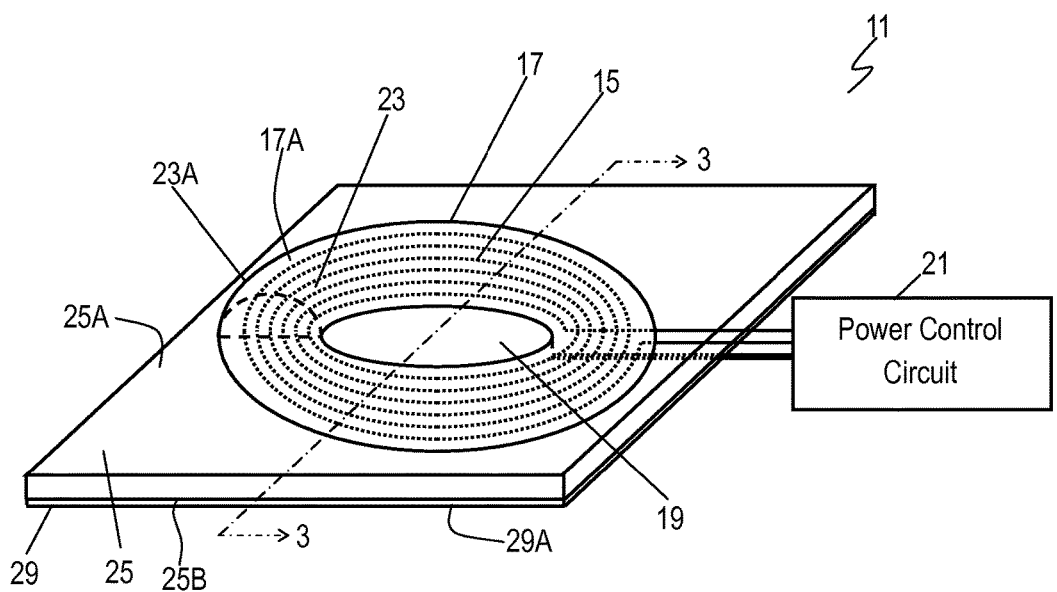
FIG. 1 is a perspective view of a power transmission coil according to Exemplary Embodiment 1 of the present invention.
Figure 2A:
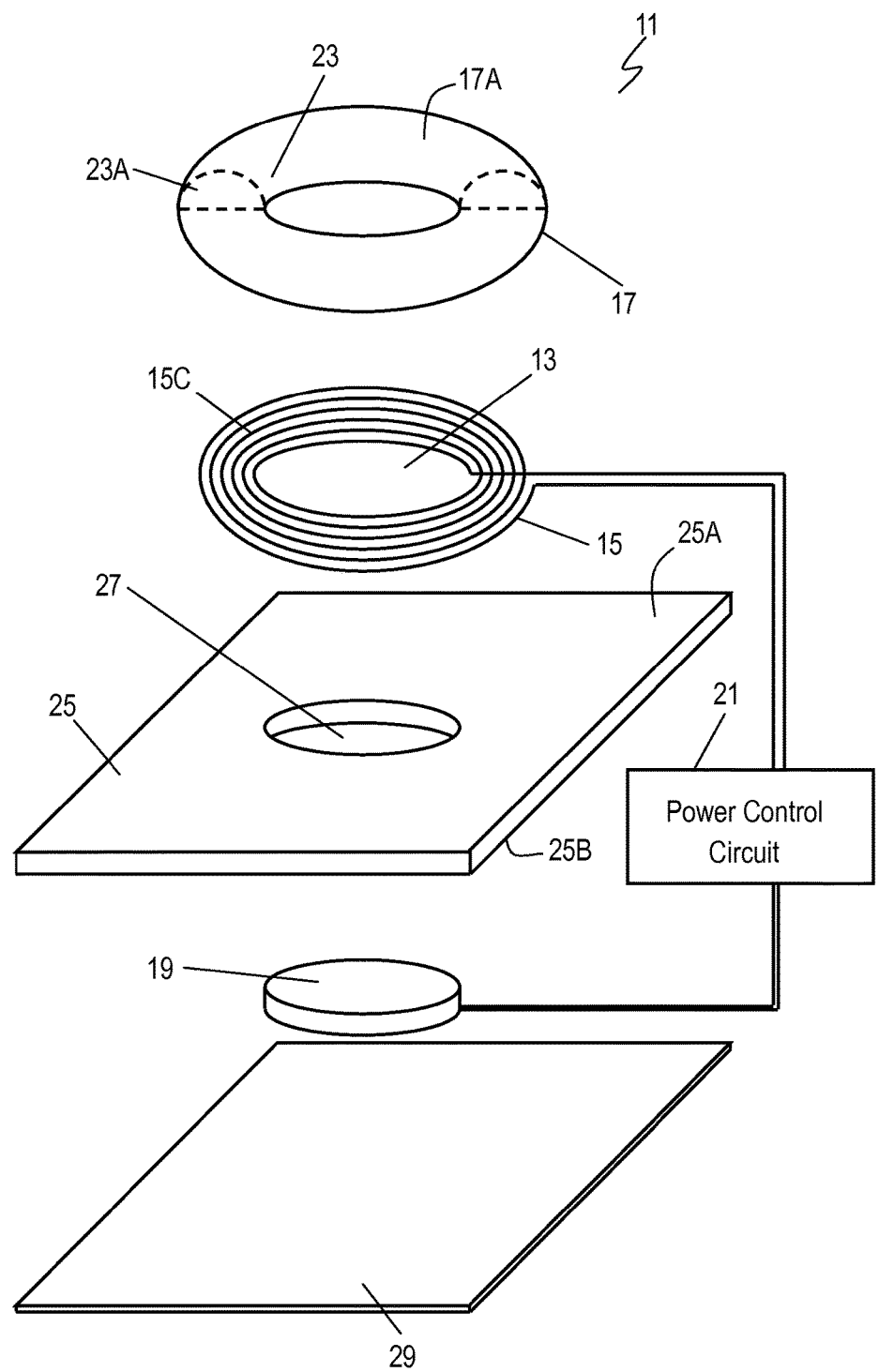
FIG. 2A is an exploded perspective view of the power transmission coil according to Embodiment 1.
Figure 3:
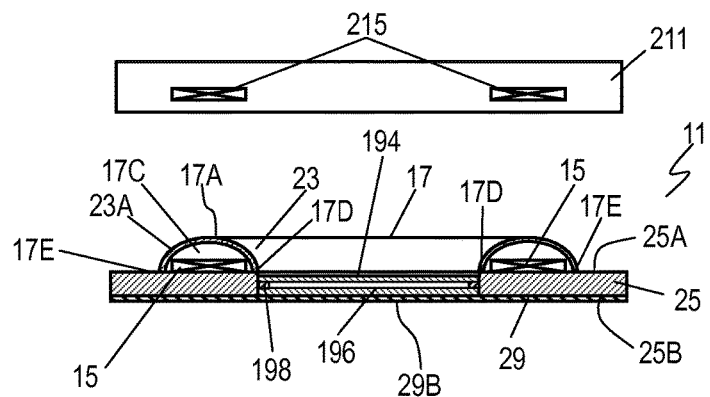
FIG. 3 is a sectional view of the power transmission coil at line 3-3 shown in FIG. 1.

FIG. 1 is an exploded perspective view of power transmission coil 11 according to Exemplary Embodiment 1 of the present invention. FIG. 2A is an exploded perspective view of power transmission coil 11. FIG. 3 is a sectional view of power transmission coil 11 at line 3-3 shown in FIG. 1.

Power transmission coil 11 includes base 25, plane coil 15 provided on upper surface 25A of base 25, cover 17 provided on upper surface 25A of base 25, foreign-matter-detecting unit 19, and power control circuit 21 electrically connected to plane coil 15 and foreign-matter-detecting unit 19. Plane coil 15 includes no-wire portion 13 and coil wire 15C wound about no-wire portion 13. No-wire portion 13 is provided at a center of plane coil 15. Plane coil 15 has an annular shape about no-wire portion 13 viewing from above. Coil wire 15C is not positioned in no-wire portion 13. Cover 17 covers plane coil 15 from above so as to expose at least a part of no-wire portion 13 from cover 17. Cover 17 has an annular shape viewing from above. Foreign-matter-detecting unit 19 is provided at no-wire portion 13. Upper surface 17A of cover 17 has inclining portion 23 inclining toward foreign-matter-detecting unit 19. Inclining portion 23 inclines to inner circumference 17D of cover 17 having the annular shape. Power control circuit 21 causes plane coil 15 to transmit power if power control circuit 21 does not detect a foreign matter based on an output from foreign-matter-detecting unit 19. Power control circuit 21 causes plane coil 15 to stop transmitting power if power control circuit 21 detects a foreign matter based on an output from foreign-matter-detecting unit 19.

Figure 11:
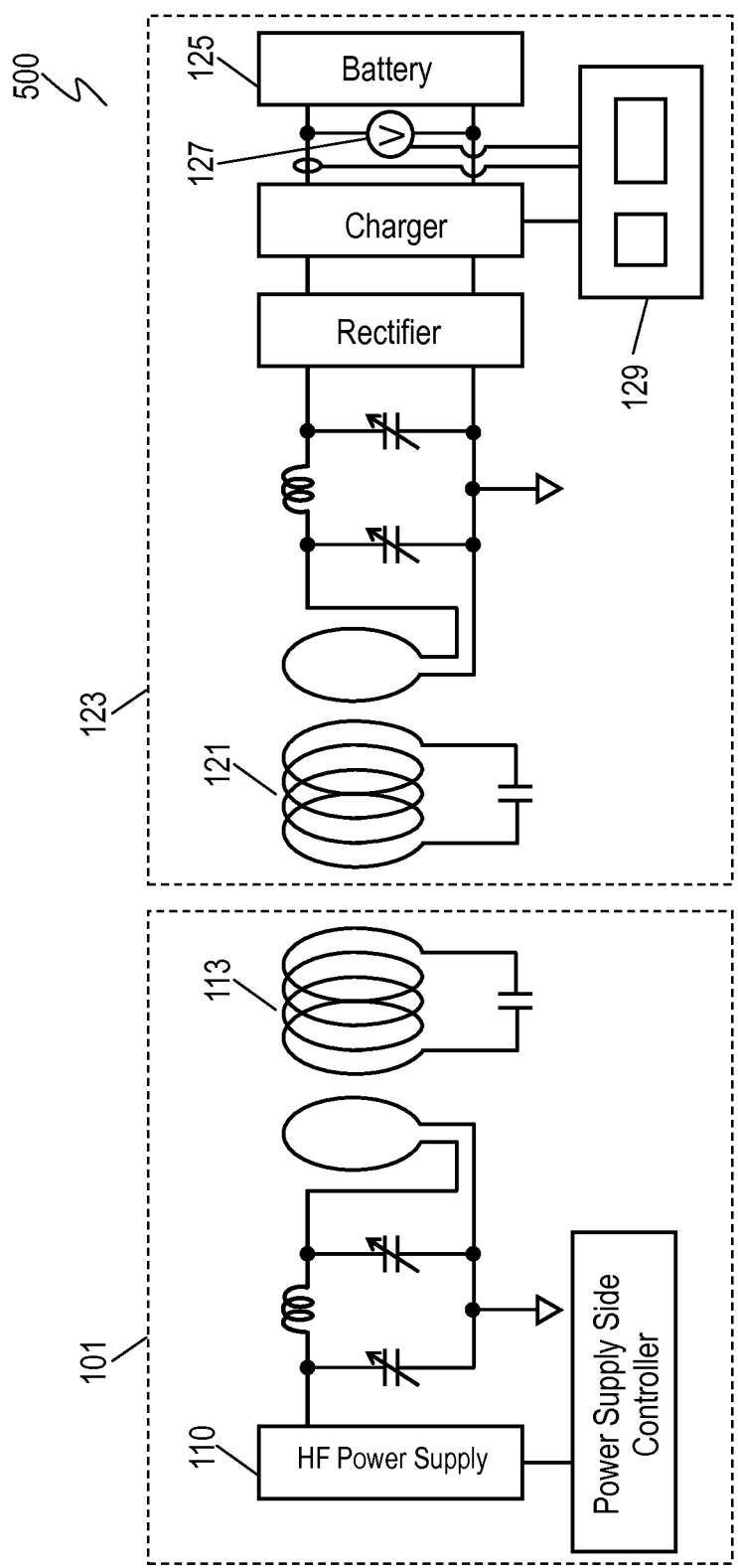
FIG. 11 is a block diagram of a conventional resonance-type non-contact power supply system.

Resonance-type non-contact power supply system 500 shown in FIG. 11 determines the presence of foreign matter according to the impedance value of battery 125. The system, not including a dedicated sensor for detecting the presence of a foreign matter, cannot detect a foreign matter smaller than a size determined by conditions including the size of primary resonant coil 113 and secondary resonant coil 121 and the amount of power to be supplied. If power is supplied while a small foreign matter is present the foreign matter may generate heat depending on a heat balance between heat generation and heat discharge according to the material and heat capacity of the small foreign matter.

Figure 4:
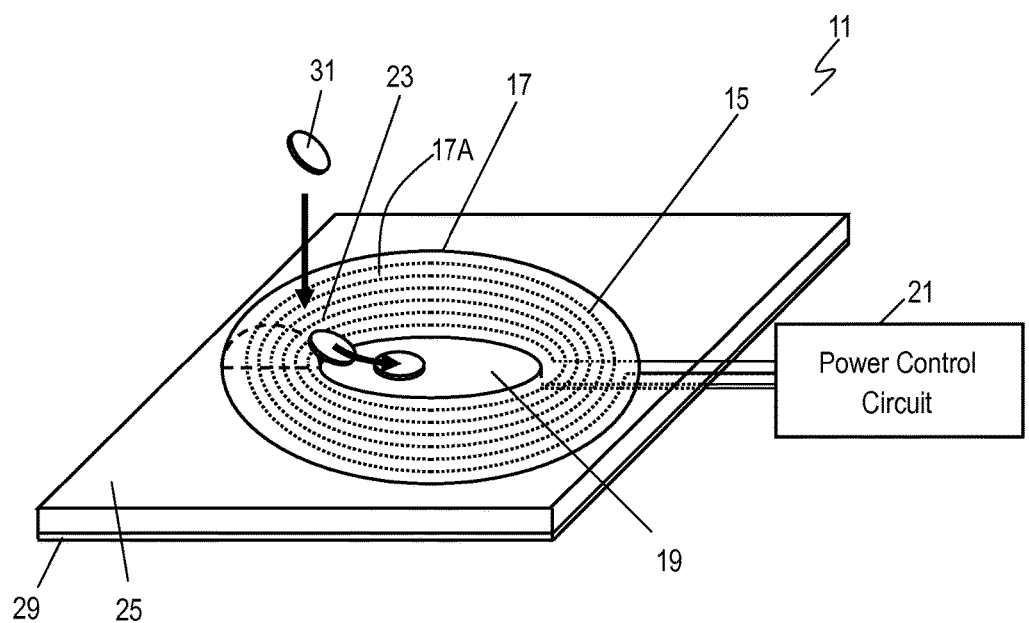
FIG. 4 is a perspective view of the power transmission coil according to Embodiment 1.

FIG. 4 is a perspective view of power transmission coil 11 according to Embodiment 1 in the case that foreign matter 31 drops. Foreign matter 31 drops toward plane coil 15 is introduced to foreign-matter-detecting unit 19 provided at no-wire portion 13 of plane coil 15 with inclining portion 23 of cover 17. This operation significantly reduces the possibility of foreign matter 31 remaining on coil wire 15C of plane coil 15 after dropping. Therefore, even if plane coil 15 generates a magnetic field, this operation prevents foreign matter 31 from generating heat due to the magnetic field. Further, foreign matter 31 which has dropped contacts foreign-matter-detecting unit 19 and is placed on foreign-matter-detecting unit 19. This configuration allows foreign-matter-detecting unit 19 to directly detect the presence of even small foreign matter 31. Thus, foreign-matter-detecting unit 19 can detect small foreign matter 31 that may generate heat, and power control circuit 21 stops power transmission when detecting foreign matter 31, thereby allowing power transmission coil 11 to reduce the possibility of foreign matter 31 generating heat.

The structure and an operation of power transmission coil 11 will be detailed below.

Coil wire 15C as a primary side of power transmission coil 11 of plane coil 15 wound on a plane (upper surface 25A of base 25) is made of, e.g. a litz wire. According to Embodiment 1, coil wire 15C of plane coil 15 is wound spirally in a single layer on one plane. Coil wire 15C may be wound in plural layers. In this case, entire coil wire 15C in the layers is referred to as plane coil 15.

Plane coil 15 including coil wire 15C is fixed to base 25 made of resin material. Upper surface 25A of base 25 may have a groove therein for accommodating coil 15.

Cover 17 is provided above plane coil 15 fixed to base 25. As shown in FIG. 1, cover 17 has a size and a shape to cover entire plane coil 15 except no-wire portion 13 and a lead wire.

Cover 17 is made of resin material having an annular shape viewing from above, as shown in FIG. 2A, and has a semicircular cross section, as shown in FIG. 3. In other words, cover 17 has a shape obtained by horizontally bisecting a ring with a circular cross section. Accordingly, upper surface 17A of cover 17 has inclining portion 23 inclining toward inner circumference 17D having a ring shape to inner circumference 17D. Upper surface 17A of cover 17 further has inclining portion 23A inclining toward outer circumference 17E having a ring shape to outer circumference 17E.

Cover 17 provided above plane coil 15 has a hollow structure which has hollow 17C and which does not have a bottom. Cover 17 may have a solid structure without hollow 17C. In this case, cover 17, not base 25, may have a groove therein for fixing coil wire 15C of plane coil 15.

Upper surface 25A of base 25 has hole 27 therein. According to Embodiment 1, hole 27 is a through-hole. Hole 27 is provided at a position facing no-wire portion 13 of plane coil 15. Foreign-matter-detecting unit 19 is inserted in hole 27. Foreign-matter-detecting unit 19 is inserted in hole 27 from lower surface 25B of base 25 and fixed, resulting in foreign-matter-detecting unit 19 provided at no-wire portion 13.

Foreign-matter-detecting unit 19 is configured to output a signal upon touching dropping foreign matter 31. Cover 17 has an annular shape, and foreign-matter-detecting unit 19 has a circular shape. According to Embodiment 1, foreign-matter-detecting unit 19 is a contact sensor. The contact sensor includes two opposing electrodes, the resistance between the electrodes largely changes when the electrodes electrically contact each other if a foreign matter touches unit 19 or is placed on it. The contact sensor outputs this change as a signal.

Base 25 having foreign-matter-detecting unit 19 provided in hole 27 is fixed to substrate 29. Substrate 29 made of a magnetic material reduces leakage of magnetic flux generated by plane coil 15 to below lower surface 29B of substrate 29. Substrate 29 may be made of a material other than a magnetic material if the specifications of power transmission coil 11 eliminate problems caused by magnetic flux leakage generated below substrate 29 by plane coil 15.

Figure 2B:
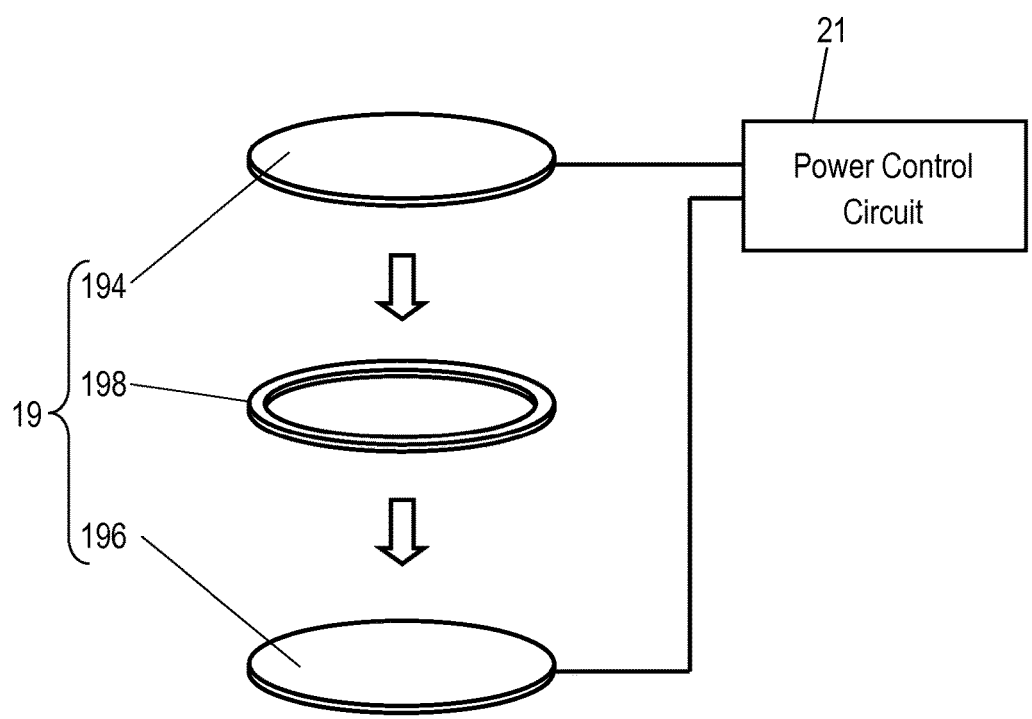
FIG. 2B is an exploded perspective view of a foreign-matter-detecting unit of the power transmission coil according to Embodiment 1.

FIG. 2B is an exploded perspective view of foreign-matter-detecting unit 19, a contact sensor. Opposing electrodes 194 and 196 face each other across spacer 198 having a ring shape. Opposing electrodes 194 and 196 face each other across air where spacer 198 is not present. If a foreign matter is not placed on foreign-matter-detecting unit 19, a path between opposing electrodes 194 and 196 electrically opens, and thus, increases the resistance between the electrodes. If a foreign matter is placed at a position other than spacer 198 on foreign-matter-detecting unit 19, electrodes 194 and 196 contact each other at the position. This decreases largely the resistance between opposing electrodes 194 and 196.

Plane coil 15 and foreign-matter-detecting unit 19 are electrically connected to power control circuit 21. Power control circuit 21 is configured to supply commercial power with its frequency converted to that for power transmission, for instance, to plane coil 15. As shown in FIG. 3, this configuration allows power to be supplied to secondary coil 215 positioned close to plane coil 15 without contacting. Further, power control circuit 21 has a built-in microprocessor for controlling power transmission according to various parameters, such as an output from foreign-matter-detecting unit 19.

Secondary coil 215 is installed into device 211 that is supplied with power without contacting. Device 211 is not limited to a particular one. A noncontact charging device for a mobile phone, for instance, allows the user to easily perceive a foreign matter present on the upper surface of the primary coil (plane coil 15). Rather than such a device, a mobile device, such as an electric vehicle or a robot, in which a foreign matter is hard to be detected by the user, exhibits the advantage of power transmission coil 11 according to Embodiment 1 significantly.

As shown in FIG. 2A, cover 17 and base 25 cover the part where coil wire 15C of plane coil 15 is wound. Here, both cover 17 and base 25 made of resin hardly interfere with a magnetic field generated by plane coil 15, and thus, cover 17 and base 25 hardly affect power transmission.

In power transmission coil 11, as shown in FIG. 2A, the inner diameter of the ring shape of cover 17 is substantially equal to the circular outer diameter of foreign-matter-detecting unit 19 within a tolerance on the shape and assembly. Accordingly, when dropping foreign matter 31 moves along inclining portion 23 of cover 17, a part of foreign matter 31 securely touches foreign-matter-detecting unit 19. Consequently, foreign-matter-detecting unit 19 can detect foreign matter 31 accurately.

The outer diameter of foreign-matter-detecting unit 19 larger than the inner diameter of cover 17 may cause a part of opposing electrodes 194 and 196 of foreign-matter-detecting unit 19 to overlap plane coil 15. This causes opposing electrodes 194 and 196 to serves as a foreign matter for plane coil 15, which may affect a magnetic field contributing to power transmission. On the other hand, the outer diameter of foreign-matter-detecting unit 19 smaller than the inner diameter of cover 17 may prevent foreign matter 31 contacting a part immediately near inner circumference 17D of cover 17 from being detected. Thus, it is preferable that the inner diameter of cover 17 is substantially equal to the outer diameter of foreign-matter-detecting unit 19.

As shown in FIG. 3, foreign-matter-detecting unit 19 is placed lower than plane coil 15. Foreign-matter-detecting unit 19 placed higher than plane coil 15 causes part of the magnetic field contributing to power transmission, generated by plane coil 15 to be applied to opposing electrodes 194 and 196 of foreign-matter-detecting unit 19, possibly affecting the power transmission. Foreign-matter-detecting unit 19 lower than plane coil 15 less affects the magnetic field; however, excessively low foreign-matter-detecting unit 19 causes base 25 to be higher accordingly and increases the distance between plane coil 15 and substrate 29 made of a magnetic material, possibly increasing magnetic flux leakage. Hence, plane coil 15 is placed at an optimum position lower than plane coil 15 in consideration of the effect on the magnetic field, the height of base 25, and magnetic flux leakage, for instance.

Foreign-matter-detecting unit 19 and plane coil 15 may be placed at the same height for a sufficiently small effect on power transmission. In this case, base 25 can be thinner, possibly reducing magnetic flux leakage.

Next, an operation of power transmission coil 11 will be described with referring to FIG. 4.

First, a case where foreign matter 31 has dropped from above plane coil 15 in a direction denoted by the arrow while power transmission coil 11 is not used will be described. Foreign matter 31 is a coin for instance. Foreign matter 31 hits cover 17 and moves along inclining portion 23 to touch foreign-matter-detecting unit 19. Then, foreign matter 31 is placed on foreign-matter-detecting unit 19.

When power control circuit 21 is turned on for starting power transmission while foreign matter 31 is placed on foreign-matter-detecting unit 19, power control circuit 21 first receives an output from foreign-matter-detecting unit 19. Foreign-matter-detecting unit 19 is a contact sensor as described above. Since opposing electrodes 194 and 196 of the contact sensor contact each other with foreign matter 31 placed on foreign-matter-detecting unit 19, the resistance between opposing electrodes 194 and 196 is small. Thus, power control circuit 21 receives an output from foreign-matter-detecting unit 19 to determine that foreign matter 31 is placed on foreign-matter-detecting unit 19.

Having determined that foreign matter 31 is placed on foreign-matter-detecting unit 19, power control circuit 21 does not start and stops power transmission, and informs the user that foreign matter 31 is placed on foreign-matter-detecting unit 19. Having determined that foreign matter 31 is not placed on foreign-matter-detecting unit 19, power control circuit 21 starts power transmission. This allows the user to check power transmission coil 11 for foreign matter 31 and to remove foreign matter 31.

This operation provides the following advantages (1) to (3).

(1) Inclining portion 23 of cover 17 greatly reduces the possibility that foreign matter 31 is placed on the wound wire of plane coil 15 where foreign-matter-detecting unit 19 cannot detect.

(2) Foreign matter 31 is led onto foreign-matter-detecting unit 19, which increases the accuracy of detecting foreign matter 31.

(3) Power control circuit 21 informs that foreign matter 31 is placed before power transmission, which reduces the possibility that foreign matter 31 generates heat due to power transmission with foreign matter 31 remaining placed.

An operation of power transmission coil 11 in that case where foreign matter 31 drops during power transmission will be described.

During power transmission, secondary coil 215 of device 211 is positioned above plane coil 15 to cover plane coil 15. Thus, foreign matter 31 that drops during the power transmission is possibly a screw or the like attached to the bottom surface of device 211 for instance. That is, a screw may loosen to some extent due to an operation of device 211, supposedly falling during power transmission.

Power control circuit 21 monitors an output from foreign-matter-detecting unit 19 even during the power transmission. If foreign matter 31, such as a screw, drops during power transmission as described above, foreign matter 31 is led along inclining portion 23 of cover 17 to foreign-matter-detecting unit 19 to touch foreign-matter-detecting unit 19, as shown in FIG. 4. This causes power control circuit 21 to detect that foreign matter 31 is placed on foreign-matter-detecting unit 19 to immediately stop power transmission through plane coil 15, which reduces the possibility of foreign matter 31 generating heat. Then, power control circuit 21 informs the user that the power transmission stops, which allows the user to move device 211 to remove foreign matter 31 for instance.

Even when foreign matter 31 drops during power transmission, the above advantages (1) and (2) are provided.

With the above structure and operation, inclining portion 23 of cover 17 leads foreign matter 31 that drops toward plane coil 15 to foreign-matter-detecting unit 19 provided at no-wire portion 13 of plane coil 15. This greatly reduces the possibility of foreign matter 31 remaining on the wound wire of plane coil 15 after foreign matter 31 drops, and thus, even if plane coil 15 generates a magnetic field, reduces the possibility of foreign matter 31 generating heat due to the magnetic field. Further, dropping foreign matter 31 touches foreign-matter-detecting unit 19 and is placed on foreign-matter-detecting unit 19, which allows foreign-matter-detecting unit 19 to directly detect even small foreign matter 31. This allows small foreign matter 31 that may generate heat to be detected. Further, when foreign matter 31 is detected, power transmission is stopped, which provides power transmission coil 11 that reduces the possibility of foreign matter 31 generating heat.

Cover 17 according to Embodiment 1 has a half-ring shape obtained by horizontally bisecting a ring shape, but not limited to this shape.

Figure 5A:
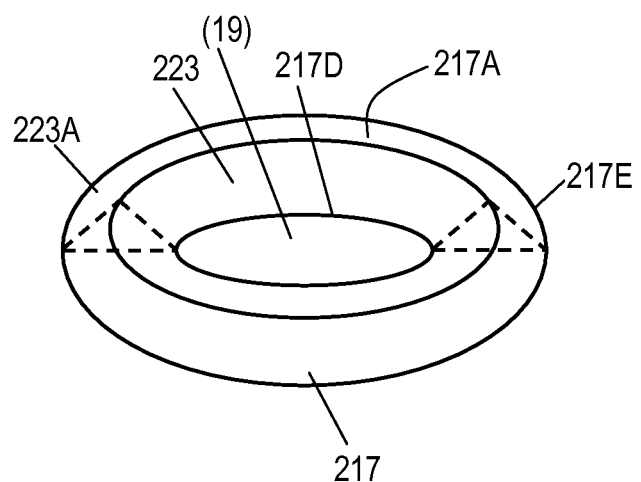
FIG. 5A is a perspective view of another cover of the power transmission coil according to Embodiment 1.

FIG. 5A is a perspective view of another cover 217 of power transmission coil 11 according to Embodiment 1. As shown in FIG. 5A, cover 217 has a ring shape viewing from above and has a triangle cross section. In this case as well, upper surface 217A of cover 217 has inclining portion 223 inclining toward foreign-matter-detecting unit 19 to inner circumference 217D of the ring shape of cover 217.

Figure 5B:
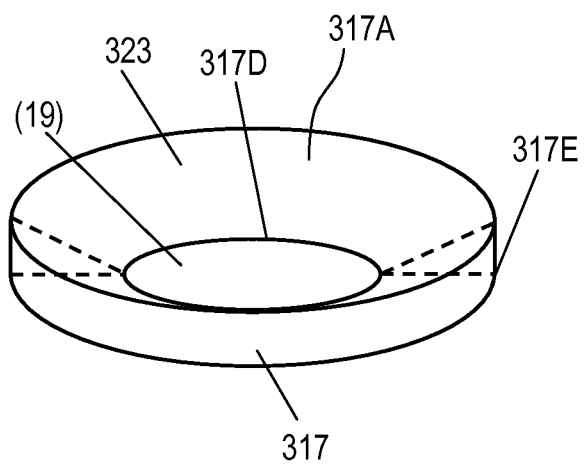
FIG. 5B is a perspective view of still another cover of the power transmission coil according to Embodiment 1.

FIG. 5B is a perspective view of still another cover 317 of power transmission coil 11 according to Embodiment 1. Cover 317 has an annular shape viewing from above. Upper surface 317A of cover 317 entirely has inclining portion 323 inclining toward inner circumference 317D of the annular shape to inner circumference 317D. In this case, foreign matter that drops toward near the outer circumference of plane coil 15 is also led to foreign-matter-detecting unit 19. Accordingly, for the specifications and environment of power transmission coil 11 that may affect power transmission due to foreign matter reaching outside the outer circumference of plane coil 15, cover 317 reduces the effect of the foreign matter on power transmission.

As long as at least a part of upper surface 17A (217A, 317A) of cover 17 (217, 317) has inclining portion 23 (223, 323) inclining toward foreign-matter-detecting unit 19 to inner circumference 17D (217D, 317D) of the annular shape of cover 17 (217, 317), the curvature and shape of upper surface 17A (217A, 317A) are not especially limited.

According to Embodiment 1, foreign-matter-detecting unit 19 is a contact sensor; however, not limited to a contact sensor utilizing the change of the resistance. More specifically, foreign-matter-detecting unit 19 may be any type of sensor, such as a sensor that detects the change of capacitance, ultrasonic waves, and infrared light, for instance as long as it detects touching or placing of a foreign matter. These components, however, may complicate the circuit, and thus foreign-matter-detecting unit 19 preferably is a contact sensor.

Foreign-matter-detecting unit 19 according to Embodiment 1 cannot discriminate the material (e.g., metal, resin, or ceramics) of foreign matter 31. Thus, power control circuit 21 detects foreign matter 31 to stop power transmission and informs the presence of foreign matter 31 even if foreign matter 31 is made of resin or ceramics that does not affect the efficiency of power transmission or heat generation. The user removes the foreign matter for instance in response to this information, which increases the possibility of foreign matter 31 being absence on the upper surface of foreign-matter-detecting unit 19, thereby increasing the accuracy of detecting foreign matter 31.

In power transmission coil 11 according to Embodiment 1, inner circumference 17D of cover 17 is placed along the inner circumference of plane coil 15, as shown in FIG. 3. Metal parts, such as opposing electrodes 194 and 196, composing foreign-matter-detecting unit 19 provided in no-wire portion 13 generate small eddy-current loss.

Figure 6:
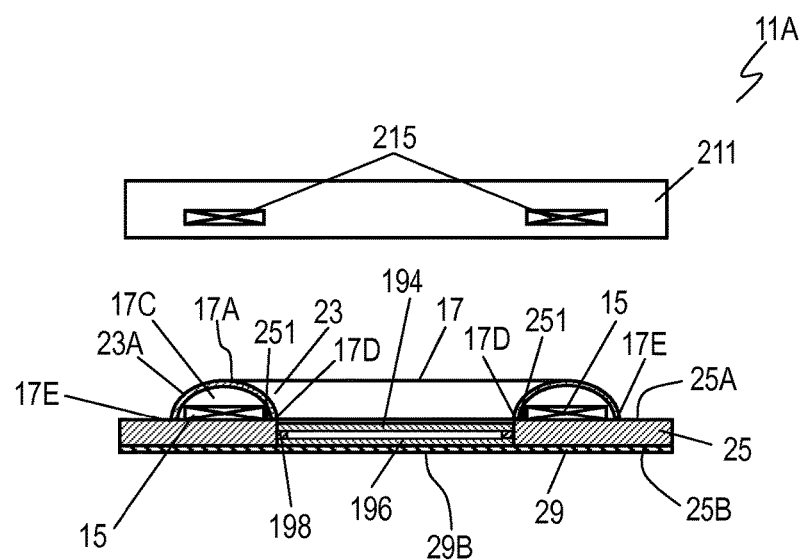
FIG. 6 is a sectional view of another power transmission coil according to Embodiment 1.

FIG. 6 is a sectional view of another power transmission coil 11A according to Embodiment 1. In FIG. 6, components identical to those of power transmission coil 11 shown in FIGS. 1 to 4 are denoted by the same reference numerals. Power transmission coil 11A further includes magnetic substance 251 made of a magnetic material, such as ferrite, provided along the inner circumference of plane coil 15. Magnetic substance 251 is placed between plane coil 15 and cover 23 and has an annular shape. Magnetic flux generated near the inner circumference of plane coil 15 concentrates at magnetic substance 251, and thus a small amount of magnetic flux reaches no-wire portion 13. This further reduces eddy-current loss generated in metal parts, such as opposing electrodes 194 and 196, composing foreign-matter-detecting unit 19 provided in no-wire portion 13.

Exemplary Embodiment 2

Figure 7A:
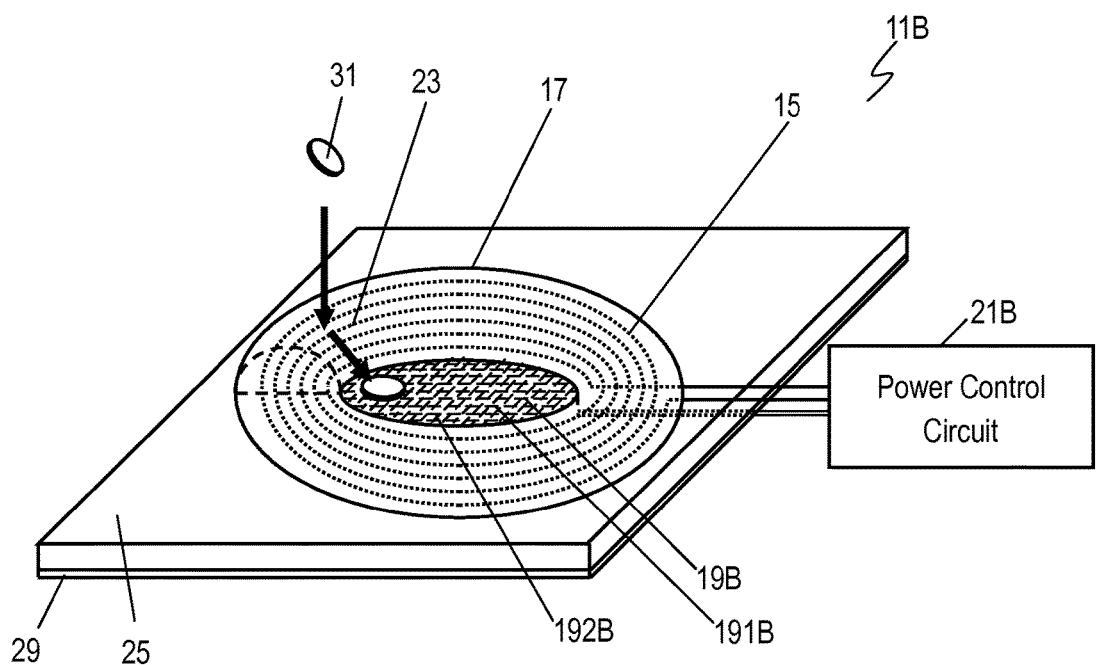
FIG. 7A is a perspective view of a power transmission coil according to Exemplary Embodiment 2 of the present invention.

FIG. 7A is a perspective view of power transmission coil 11B according to Exemplary Embodiment 2 of the present invention. In FIG. 7A, components identical to those of power transmission coil 11 according to Embodiment 1 shown in FIGS. 1 to 4 are denoted by the same reference numerals. FIG. 7A illustrates a case that foreign matter 31 drops toward power transmission coil 11B.

Power transmission coil 11B includes foreign-matter-detecting unit 19B and power control circuit 21B, instead of foreign-matter-detecting unit 19 and power control circuit 21 of power transmission coil 11 according to Embodiment 1. Power control circuit 21B, in addition to the functions of power control circuit 21 according to Embodiment 1, can determine the size of foreign matter 31 based on an output from foreign-matter-detecting unit 19B. Power control circuit 21B determines that foreign matter 31 does not contact foreign-matter-detecting unit 19B if foreign matter 31 is smaller than a predetermined size. Power control circuit 21B determines that foreign matter 31 contacts foreign-matter-detecting unit 19B if foreign matter 31 is not smaller than the predetermined size.

This provides the following advantage in addition to those of Embodiment 1. When small foreign matter 31 hardly generates heat during power transmission and thus hardly affects the efficiency of power transmission, power control circuit 21B determines that foreign matter 31 is not detected and allows plane coil 15 to transmit power. This reduces the possibility of decreasing chances of transmitting power.

Figure 7C:
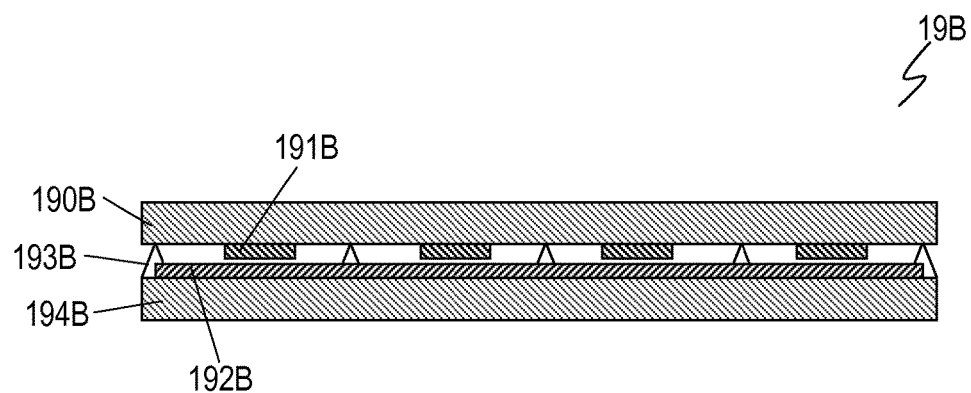
FIG. 7C is a sectional view of the foreign-matter-detecting unit shown in FIG. 7B.

The structure and an operation of power transmission coil 11B according to Embodiment 2 will be detailed below. FIGS. 7B and 7C are an exploded perspective view and a sectional view of foreign-matter-detecting unit 19B, respectively.

As shown in FIG. 7A, foreign-matter-detecting unit 19B is a contact sensor capable of detecting the size of foreign matter 31. Foreign-matter-detecting unit 19B has, as shown in FIG. 7B, electrode wires 191B extending in direction X and electrode wires 192B extending in direction Y different from direction X. Electrode wires 191B are formed on the surface of flexible film substrate 190B; electrode wires 192B are formed on the surface of flexible film substrate 194B. Film substrate 190B has insulating dot spacer 193B formed thereon so that electrode wires 191B and 192B do not contact each other while foreign matter 31 is not placed. With such a structure, as shown in FIG. 7C (a sectional view at the dot-and-dash line shown in FIG. 7B), electrode wires 191B and 192B face each other so as not to contact each other while film substrates 190B (upper) and 194B (lower) overlap. When foreign matter 31 is placed on foreign-matter-detecting unit 19, electrode wires 191B and 192B where foreign matter 31 is placed contact each other at plural positions. Power control circuit 21B detects these contact positions to determine the size of foreign matter 31. In this configuration, electrode wires 191B do not contact electrode wires 192B while foreign matter 31 is not placed on foreign-matter-detecting unit 19B. Electrode wires 191B contact electrode wires 192B while foreign matter 31 is placed on foreign-matter-detecting unit 19B.

FIG. 7A shows the wiring between electrode wires 191B and 192B and power control circuit 21B in a simplified way with two wires only.

An operation of power transmission coil 11B according to Embodiment 2 will be described below.

When foreign matter 31 is placed on foreign-matter-detecting unit 19B, power control circuit 21B determines the size of foreign matter 31, and then, compares the determined size with a predetermined size. The predetermined size is defined as the maximum size with which the efficiency of power transmission and heat generation do not cause problems when power is transmitted. Even if foreign matter 31 smaller than the predetermined size is placed on foreign-matter-detecting unit 19, foreign matter 31 allows power to be transmitted.

The predetermined size is preliminarily determined as a size that does not affect power transmission by measuring the efficiency of power transmission and heat generation while different sizes of foreign matters are actually placed on foreign-matter-detecting unit 19B. The predetermined size is stored in a memory of power control circuit 21B. In this case, the material of foreign matter 31 that affects the efficiency of power transmission and heat generation is mainly metal, and thus, the predetermined size is determined for each of different metal foreign matters. The predetermined size changes depending on the power specifications and installation environment, for instance, of power transmission coil 11, and thus, the size is determined as appropriate under actual conditions by the above method.

As shown in FIG. 7A, power control circuit 21B determines that foreign matter 31 is not detected if foreign matter 31 made of metal having a disk shape placed on foreign-matter-detecting unit 19B is smaller than the predetermined size. Consequently, if foreign matter 31 smaller than the predetermined size is placed on foreign-matter-detecting unit 19B, power control circuit 21B continues transmitting power with plane coil 15.

As shown in FIG. 7A, if foreign matter 31 having a disk shape is placed on a part immediately near plane coil 15, foreign matter 31 is positioned where foreign matter 31 affects magnetic field generated by plane coil 15 most significantly. Even if foreign matter 31 is placed on such a position, however, the efficiency of power transmission and heat generation is assuredly not cause problems, thereby allowing transmitting power.

In other words, power control circuit 21B is configured to detect the size of foreign matter 31 based on an output from foreign-matter-detecting unit 19B. Power control circuit 21B is configured to cause plane coil 15 to transmit power upon determining that foreign matter 31 is not detected if foreign matter 31 is detected in no-wire portion 13 based on an output from foreign-matter-detecting unit 19B and the size of foreign matter 31 is smaller than a predetermined size. Power control circuit 21B is configured to cause plane coil 15 to stop transmitting power if foreign matter 31 is detected at no-wire portion 13 based on an output from foreign-matter-detecting unit 19B and the size of the foreign matter is not smaller than the predetermined size.

However, if plural foreign matters 31 smaller than the predetermined size are placed on foreign-matter-detecting unit 19 and when the total size of foreign matters 31 exceeds the predetermined size, power control circuit 21B stops transmitting power and informs the user of the presence of foreign matters 31.

Even if detecting foreign matter 31 smaller than the predetermined size before starting to transmit power and during power transmission, power control circuit 21B determines that foreign matter 31 is not detected since foreign matter 31 does not affect power transmission.

If foreign matter 31 is small to hardly generate heat and thus hardly affect the efficiency of power transmission, power control circuit 21B determines that foreign matter 31 is not detected, which provides power transmission coil 11B that reduces the possibility of decreasing of transmitting power.

In power transmission coil 11B according to Embodiment 2, foreign-matter-detecting unit 19B cannot determine the material, such as metal, resin, or ceramics, of foreign matter 31. Even if foreign matter 31 is made of resin or ceramics that hardly affects the efficiency of power transmission and heat generation, if the size of foreign matter 31 is not smaller than the predetermined size, power control circuit 21B detects foreign matter 31; stops transmitting power; and informs the user of the presence of foreign matter 31. This increases the possibility that the user removes foreign matter 31 for instance, which accordingly increases the accuracy of detecting foreign matter 31.

Exemplary Embodiment 3

Figure 8:
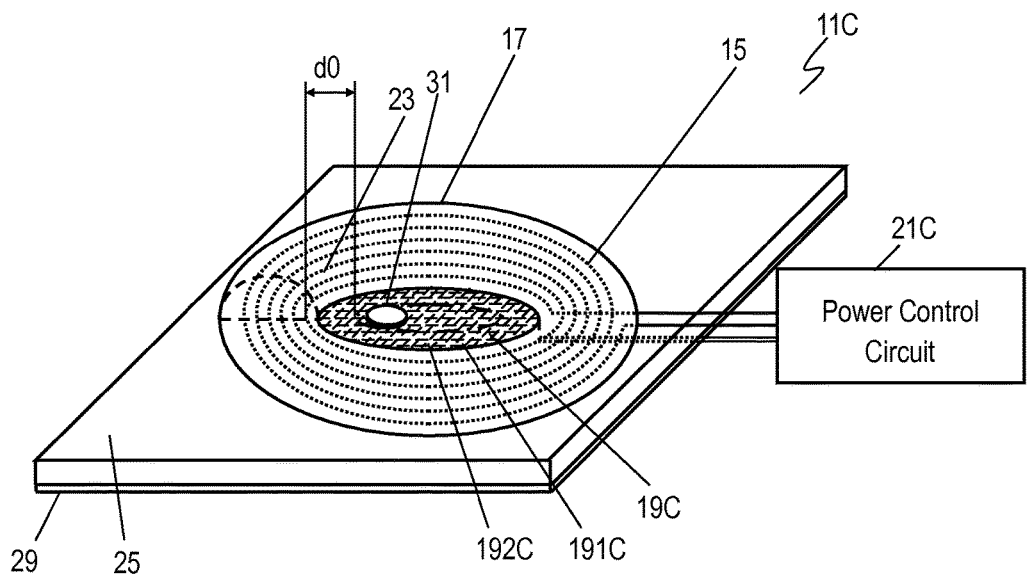
FIG. 8 is a perspective view of a power transmission coil according to Exemplary Embodiment 3 of the present invention.

FIG. 8 is a perspective view of power transmission coil 11C according to Exemplary Embodiment 3 of the present invention. In FIG. 8, components identical to those of power transmission coil 11 according to Embodiment 1 shown in FIGS. 1 to 4 are denoted by the same reference numerals.

Power transmission coil 11C includes foreign-matter-detecting unit 19C and power control circuit 21C, instead of foreign-matter-detecting unit 19 and power control circuit 21 of power transmission coil 11 according to Embodiment 1. Power control circuit 21C has the following function in addition to the functions of power control circuit 21 according to Embodiment 1. That is, if foreign matter 31 is located away from plane coil 15 by a distance not smaller than predetermined distance d0, power control circuit 21C determines that foreign matter 31 is not detected based on an output from foreign-matter-detecting unit 19C; otherwise, determines that foreign matter 31 is detected if foreign matter 31 is located away from plane coil 15 by a distance smaller than predetermined distance d0.

Accordingly, in addition to the advantages of the coil according to Embodiment 1, if foreign matter 31 is placed at a position where foreign matter 31 hardly generates heat during power transmission and thus hardly affects the efficiency of power transmission, power control circuit 21C determines that foreign matter 31 is not detected, thereby reducing the possibility of decreasing chances of transmitting power.

The structure and an operation of power transmission coil 11C according to Embodiment 3 will be detailed below.

Foreign-matter-detecting unit 19C is a contact sensor capable of detecting the position of foreign matter 31. Foreign-matter-detecting unit 19C, similarly to foreign-matter-detecting unit 19B according to Embodiment 2, is configured so that plural electrode wires 191C and 192C extending in directions X and Y of foreign-matter-detecting unit 19C face each other so as not to contact each other while a foreign matter is not placed. Thus, power control circuit 21C sequentially checks positions at which electrode wires 191C and 192C contact when foreign matter 31 is placed on foreign-matter-detecting unit 19C. This operation allows power control circuit 21C to detect the position of foreign matter 31.

When foreign matter 31 is placed on foreign-matter-detecting unit 19C, power control circuit 21C detects the position of foreign matter 31. Then, power control circuit 21C determines whether or not entire foreign matter 31 is located away from the inner circumference of plane coil 15 by a distance not smaller than predetermined distance d0. Predetermined distance d0 is defined as the minimum length between foreign matter 31 and plane coil 15 with which the efficiency of power transmission and heat generation do not cause problems when power is transmitted. When the entire of foreign matter 31 is placed on the inside of the part enclosed by the thick broken line that is a circle concentric with the outer circumference of foreign-matter-detecting unit 19C shown in FIG. 8, power control circuit 21C determines that foreign matter 31 is located away from plane coil 15 by a distance not smaller than predetermined distance d0. Plane coil 15 having no-wire portion 13 generates a weaker magnetic field closer to the center of no-wire portion 13 during power transmission, and thus foreign matter 31 less affects power transmission. Accordingly, foreign matter 31 located away from plane coil 15 by a distance not smaller than predetermined distance d0 allows transmitting power even if remaining placed on foreign-matter-detecting unit 19C.

Power control circuit 21C is configured to detect the position of foreign matter 31 based on an output from foreign-matter-detecting unit 19C. Power control circuit 21C is configured to cause plane coil 15 to transmit power upon determining that foreign matter 31 is not detected if foreign matter 31 is detected at no-wire portion 13 based on an output from foreign-matter-detecting unit 19C and foreign matter 31 is located away from plane coil 15 by a distance not smaller than predetermined distance d0. Power control circuit 21C is configured to cause plane coil 15 to stop transmitting power if foreign matter 31 is detected at no-wire portion 13 based on an output from foreign-matter-detecting unit 19C and foreign matter 31 is located at a position away from plane coil 15 by a distance smaller than predetermined distance d0.

Predetermined distance d0 is determined as a distance that does not affect power transmission by measuring the efficiency of power transmission and heat generation while foreign matter 31 is placed on various positions of foreign-matter-detecting unit 19C, and the distance is preliminarily stored in the memory of power control circuit 21C. The material of foreign matter 31 that affects the efficiency of power transmission and heat generation is mainly metal, and thus, the respective values of predetermined distance d0 is determined for different metal materials, and the maximum value among them is defined as predetermined distance d0. Predetermined distance d0 changes depending on the power specifications and installation environment, for instance, of power transmission coil 11C, and thus is determined as appropriate under actual conditions by the above method.

Consequently, power control circuit 21C determines that foreign matter 31 is not detected if foreign matter 31 placed on foreign-matter-detecting unit 19C is located away from plane coil 15 by a distance not smaller than predetermined distance d0. Thus, power control circuit 21C continues transmitting power even if foreign matter 31 is placed on a position of foreign-matter-detecting unit 19C located away from plane coil 15 by a distance not smaller than predetermined distance d0.

However, if plural foreign matters 31 are placed on foreign-matter-detecting unit 19C and at least one of them is located away from plane coil 15 by a distance smaller than predetermined distance d0, power control circuit 21C stops transmitting power and informs the user of the presence of foreign matter 31.

Even if power control circuit 21C detects foreign matter 31 predetermined distance d0 or more away from plane coil 15 before starting to transmit power and during power transmission, power control circuit 21C determines that foreign matter 31 is not detected since foreign matter 31 does not affect power transmission.

If foreign matter 31 is placed on foreign-matter-detecting unit 19C where foreign matter 31 hardly generates heat during power transmission and thus hardly affects the efficiency of power transmission, power control circuit 21C determines that foreign matter 31 is not detected, which provides power transmission coil 11C that reduces the possibility of decreasing chances of transmitting power.

Foreign-matter-detecting unit 19C according to Embodiment 3 cannot determine the material, such as metal, resin, or ceramics, of foreign matter 31. Accordingly, even if foreign matter 31 is made of resin or ceramics that hardly affects the efficiency of power transmission and heat generation, if foreign matter 31 is positioned away from plane coil 15 by a distance smaller than predetermined distance d0, power control circuit 21C detects foreign matter 31, stops transmitting power, and informs the user of the presence of foreign matter 31. This operation increases the possibility that the user removes foreign matter 31, which accordingly increases the accuracy of detecting foreign matter 31.

Figure 9:
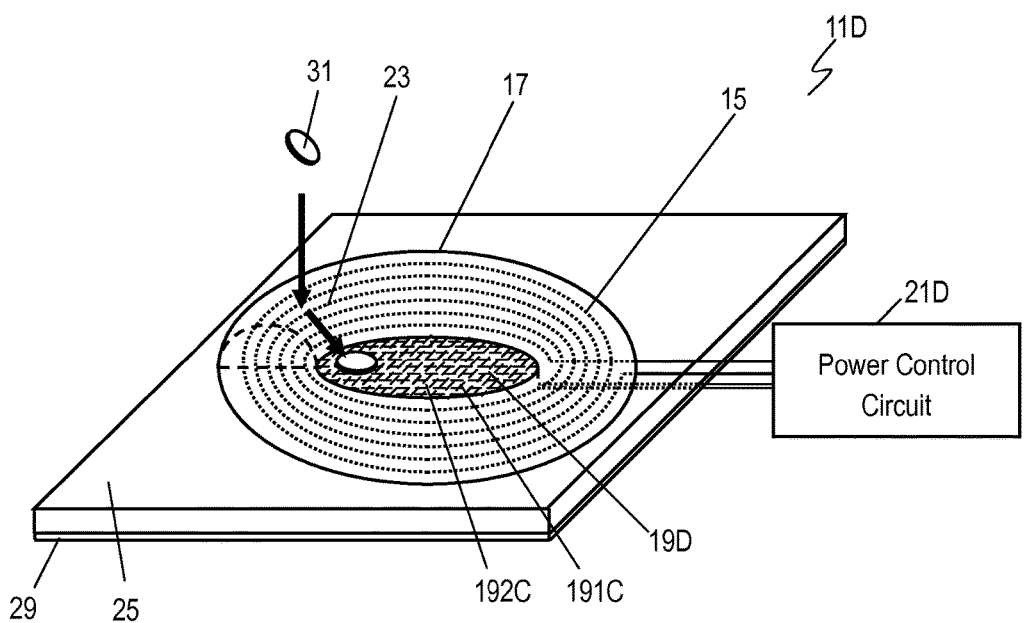
FIG. 9 is a perspective view of another power transmission coil according to Embodiment 3.

FIG. 9 is a perspective view of another power transmission coil 11D according to Embodiment 3. In FIG. 9, components identical to those of power transmission coil 11C shown in FIG. 8 are denoted by the same reference numerals.

Power transmission coil 11D includes foreign-matter-detecting unit 19D and power control circuit 21D, instead of foreign-matter-detecting unit 19C and power control circuit 21C of power transmission coil 11C shown in FIG. 8. Power control circuit 21D can determine the size of foreign matter 31 and whether or not foreign matter 31 is located away from plane coil 15 by a distance not smaller than predetermined distance d0 based on an output from foreign-matter-detecting unit 19D. If the size of foreign matter 31 is smaller than the predetermined size, or if foreign matter 31 is located away from plane coil 15 by a distance not smaller than predetermined distance d0, power control circuit 21D determines that foreign matter 31 is not detected and continues transmitting power through plane coil 15. If the size of foreign matter 31 is not smaller than the predetermined size and foreign matter 31 is located away from plane coil 15 by a distance smaller than predetermined distance d0, power control circuit 21D determines that foreign matter 31 is detected and stops transmitting power through plane coil 15. This operation further reduces the possibility of decreasing chances of transmitting power.

Exemplary Embodiment 4

Figure 10:
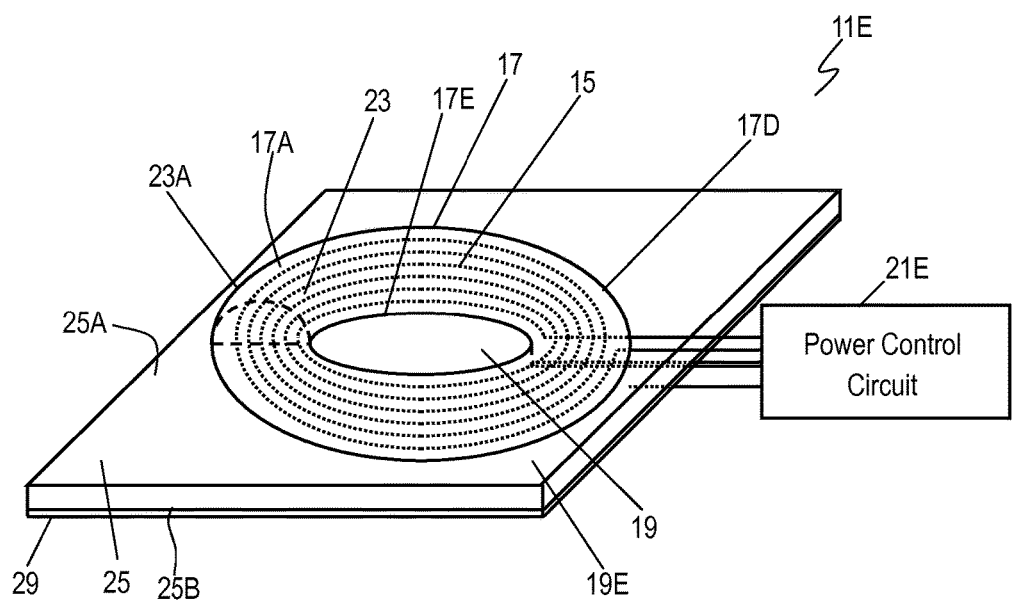
FIG. 10 is a perspective view of a power transmission coil according to Exemplary Embodiment 4 of the present invention.

FIG. 10 is a perspective view of power transmission coil 11E according to Exemplary Embodiment 4. In FIG. 10, components identical to those of power transmission coil 11 according to Embodiment 1 shown in FIG. 1 are denoted by the same reference numerals.

In the plane coil according to Embodiments 1 to 3, foreign-matter-detecting unit 19 is placed only in no-wire portion 13 of plane coil 15. Power transmission coil 11E according to Embodiment 4 further includes foreign-matter-detecting unit 19E placed outside plane coil 15. In the plane coil according to Embodiments 1 to 3, the secondary coil is assumed to hardly deviate with respect to plane coil 15, and thus a magnetic field generated by foreign matter 31 outside plane coil 15 affects power transmission to a relatively small degree. Accordingly, in the power transmission coil according to Embodiments 1 to 3, foreign-matter-detecting unit 19 is not placed outside plane coil 15.

If the secondary coil deviates with respect to plane coil 15, a magnetic field effective in power transmission may be generated outside plane coil 15 as well. In this case, foreign matter 31 may affect power transmission.

In this case, upper surfaces 17A and 217A of covers 17 and 217 shown in FIGS. 1 and 5A according to Embodiment 1 further has inclining portions 23A and 223A extending toward the foreign-matter-detecting unit placed outside plane coil 15, besides inclining portions 23 and 223 extending toward foreign-matter-detecting unit 19, which decreases the possibility that foreign matter 31 is positioned near the outer circumference of plane coil 15. Foreign-matter-detecting unit 19E according to Embodiment 4 includes plane electrodes facing each other similarly to the coil according to Embodiment 1. These plane electrodes are placed in no-wire portion 13 of plane coil 15 and near the outer circumference of plane coil 15.

Power control circuit 21E is configured to cause plane coil 15 to transmit power if foreign matter 31 is not detected outside plane coil 15 based on an output from foreign-matter-detecting unit 19E. Power control circuit 21E is configured to cause plane coil 15 to stop transmitting power if foreign matter 31 is detected outside plane coil 15 based on an output from foreign-matter-detecting unit 19E.

In power transmission coil 11E according to Embodiment 4, if foreign matter 31 is positioned near the outer circumference of plane coil 15 due to inclining portions 23A and 223A inclining outside plane coil 15, power control circuit 21E can detect foreign matter 31 with foreign-matter-detecting unit 19E placed outside plane coil 15, which reduces the possibility that foreign matter 31 generates heat.

Foreign-matter-detecting unit 19E may be configured to detect the size and position of foreign matter 31 to determine whether or not power control circuit 21E transmits power through plane coil 15, similarly to the foreign-matter-detecting unit according to Embodiments 2 and 3. This case also reduces the possibility of decreasing chances of transmitting power.

In the power transmission coils according to Embodiments 1 to 4, plane coil 15 is the primary (power-transmission side) coil, but may be the secondary (power-reception side) coil. This case as well provides the same advantages as the power transmission coil according to Embodiments 1 to 4.

In Embodiments 1 to 4, terms, such as "upper surface," "above," and "below", indicating directions merely indicate relative directions depending only on relative, positional relationships of the components, such as the base, the plane coil, and the cover, of a power transmission coil, and do not indicate absolute directions such as a vertical direction.

INDUSTRIAL APPLICABILITY

A power transmission coil according to the present invention detects a small foreign matter that can generate heat and reduces the possibility of the heat generation, and thus is useful especially for a power transmission coil for non-contact power supply for instance.

REFERENCE MARKS IN THE DRAWINGS 13 no-wire portion
15 plane coil
17 cover
17A upper surface
19, 19A-19D foreign-matter-detecting unit (first foreign-matter-detecting unit)
19E foreign-matter-detecting unit (second foreign-matter-detecting unit)
21, 21A-21E power control circuit
23 inclining portion (first inclining portion)
23A inclining portion (second inclining portion)
191B electrode wire (first electrode wire)
192B electrode wire (second electrode wire)

The invention claimed is:

1. A power transmission coil comprising:
   a plane coil including a coil wire wound about a no-wire portion, the plane coil being configured to transmit power;
   a cover for covering the plane coil from above;
   a first foreign-matter-detecting unit provided at the no-wire portion, and configured to output a signal upon a foreign matter contacting the first foreign-matter-detecting unit; and
   a power control circuit electrically connected to the plane coil and the first foreign-matter-detecting unit,
   wherein an upper surface of the cover has a first inclining portion inclining toward the first foreign-matter-detecting unit, and
   wherein the power control circuit is configured:
      to cause the plane coil to transmit power if a foreign matter is not detected at the no-wire portion based on an output from the first foreign-matter-detecting unit; and
      to cause the plane coil to stop transmitting power if foreign matter is detected at the no-wire portion based on an output from the first foreign-matter-detecting unit.

2. The power transmission coil according to claim 1, wherein the first foreign-matter-detecting unit includes a contact sensor which has opposing electrodes facing each other and is configured to output a signal upon the foreign matter contacting the first foreign-matter-detecting unit based on a resistance value between the opposing electrodes.

3. The power transmission coil according to claim 1, wherein the first foreign-matter-detecting unit includes a plurality of first electrode wires extending in a predetermined direction and a plurality of second electrode wires extending in a direction different from the predetermined direction, and
   wherein the plurality of first electrode wires are configured:
      not to contact the second electrode wires when the foreign matter is placed on the first foreign-matter-detecting unit, and
      to contact the second electrode wires when the foreign matter is not placed on the first foreign-matter-detecting unit.

4. The power transmission coil according to claim 1, wherein the first foreign-matter-detecting unit is provided at a lower position than the plane coil.

5. The power transmission coil according to claim 1, wherein the power control circuit is configured:

to detect a size of the foreign matter based on an output from the first foreign-matter-detecting unit;

to cause the plane coil to transmit power upon determining that the foreign matter is not detected if the foreign matter is detected in the no-wire portion based on an output from the first foreign-matter-detecting unit and the size of the foreign matter is smaller than a predetermined size; and to cause the plane coil to stop transmitting power if the foreign matter is detected at the no-wire portion based on an output from the first foreign-matter-detecting unit and the size of the foreign matter is not smaller than the predetermined size.

6. The power transmission coil according to claim 1, wherein the power control circuit is configured:

to detect a position of the foreign matter based on an output from the first foreign-matter-detecting unit;

to cause the plane coil to transmit power upon determining that the foreign matter is not detected if the foreign matter is detected at the no-wire portion based on an output from the first foreign-matter-detecting unit and the foreign matter is located away from the plane coil by a distance not smaller than a predetermined distance; and to cause the plane coil to stop transmitting power if the foreign matter is detected at the no-wire portion based on an output from the first foreign-matter-detecting unit and the foreign matter is located at a position away from the plane coil by a distance smaller than the predetermined distance.

7. The power transmission coil according to claim 1, further comprising a second foreign-matter-detecting unit provided outside the plane coil, wherein the power control circuit is configured:

to cause the plane coil to transmit power if the foreign matter is not detected outside the plane coil based on an output from the second foreign-matter-detecting unit; and to cause the plane coil to stop transmitting power if the foreign matter is detected outside the plane coil based on an output from the second foreign-matter-detecting unit.

8. The power transmission coil according to claim 7, wherein the upper surface of the cover further includes a second inclining portion inclining toward an outside of the plane coil.

* * * * *